June 1, 1937. H. H. RUBIN ET AL Re. 20,390
GRIP STRAP
Original Filed Jan. 6, 1932.
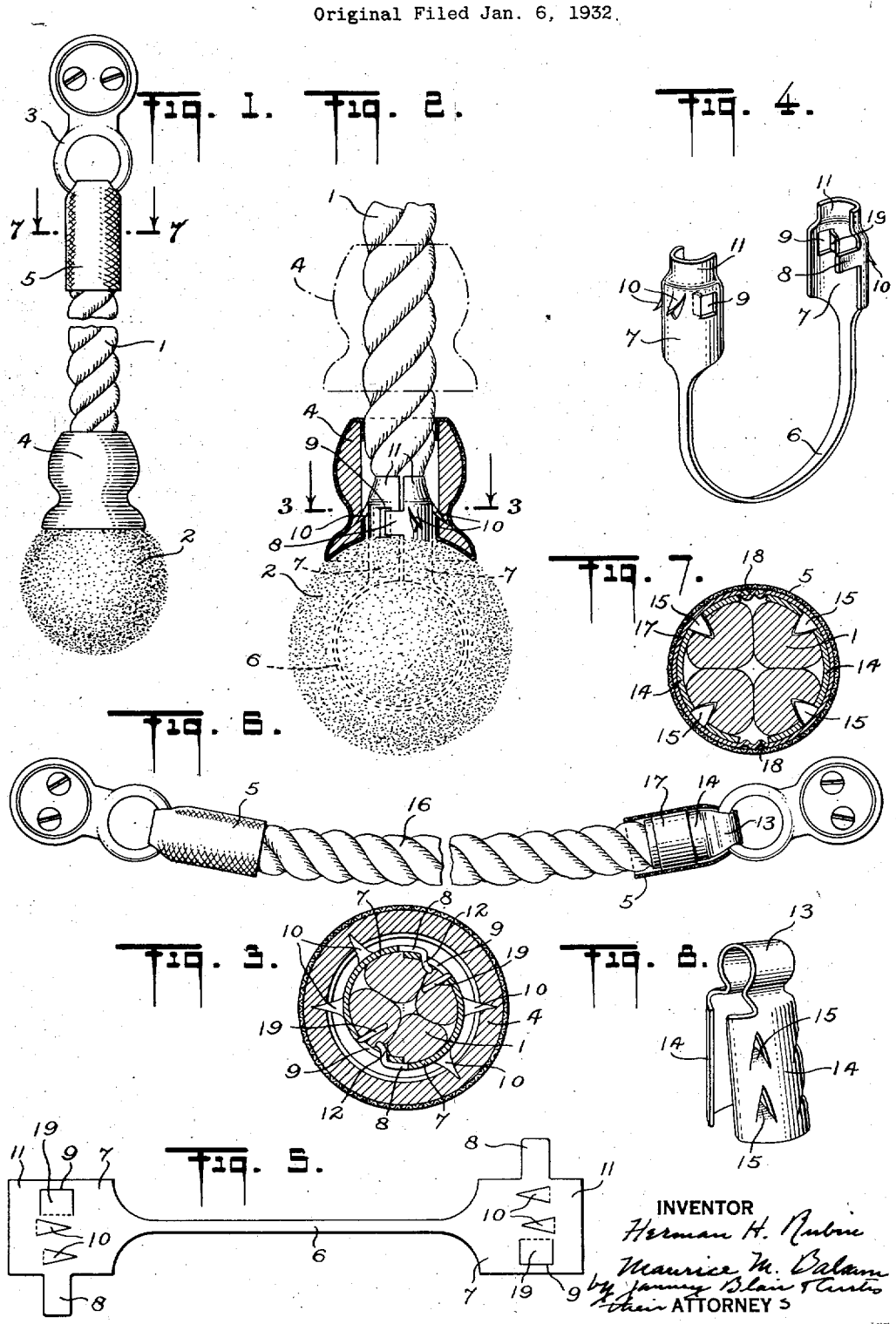
INVENTOR
Herman H. Rubin
Maurice M. Balam
by Jenny Blair Curtis
Their ATTORNEYS Reissued June 1, 1937

Re. 20,390

UNITED STATES PATENT OFFICE 20,390

GRIP STRAP

Herman H. Rubin and Maurice M. Balsam, New York, N. Y., said Balsam assignor to said Rubin Original No. 2,003,515, dated June 4, 1935, Serial No. 584,978, January 6, 1932. Application for reissue December 14, 1936, Serial No. 115,890

5 Claims. (Cl. 105—354)

This invention relates to an improvement in assist grips or hand holds having the general purposes and uses of the well known automobile fittings such as robe rails which are suspended between supports at both ends and/or grip straps in which a pompon, gripping member, or the like, is fastened to one end of a suitable stem, frequently in the form of a piece of rope or cord, the other end of said stem carrying a bracket or other suitable means for attaching the hand hold to the interior of an automobile.

Our invention is directed more particularly to improving the means whereby the end devices, as the pompon, grip member, and/or the bracket may be effectively secured to the body, stem or tension member of an assist grip or robe rail of the kind above described or similar thereto. In the case of grip straps it was long customary to attach the pompon to the stem or cord by sewing; but this was not satisfactory because the resulting fastening was too fragile and inadequate to provide a yield point load sufficient to meet more recent practical requirements in the automobile trade; and the users of assist grips of the sewed on pompon type found that the pompon became too readily loosened or entirely detached. In the case of robe rails and of grip straps, the supporting brackets were fastened to the stems or cords by various expedients many of which involve expensive hand operations in manufacture and often prove inadequately secure for the intended purpose.

The defects above mentioned were remedied to a certain extent by an attaching device utilizing metal parts, illustrated in Rubin's Patent No. 1,703,321 and including a metal yoke or bail passing around the pompon and having its free ends clamped under a ring or the like encircling the lower end of the stem. This construction has been successful in so far as it provides a secure fastening of the pompon or other end device to the stem; but it has been found desirable to simplify manufacturing operations by reducing the number of parts and/or eliminating steps in the manufacturing process which have heretofore been considered necessary. Accordingly, a further object of our invention has been to provide a reliable end fastening involving a minimum number of parts and adapted to be assembled with the stem in a simple and expeditious manner.

In grip strap construction it has also been customary to employ a ferrule, sometimes called a mold, for the purpose of concealing the joint or fastening between the pompon or end device and the stem. This mold is commonly glued in its operative position. A further object of our invention has been to provide means, associated with the end device fastening means, whereby the mold may be held in normal operative position without the use of glue, thus doing away with an undesirable ingredient in the finished product and eliminating the gluing operation to the advantage of the manufacturer.

Preferred embodiments of our invention are illustrated in the drawing appended to the present specification and in which Figure 1 is a side view of an assist grip having a pompon at one end;

Figure 2, a similar view enlarged and with the mold displaced to reveal the pompon fastening means;

Figure 3, a transverse section on the line 3—3 of Figure 2;

Figure 4, a detail perspective view illustrating a form of fastening means combining a clamp and a pompon engaging strap;

Figure 5, a plan view of a metal blank from which the device of Figure 4 may be formed;

Figure 6, a side view of an assist grip of the robe rail type with a portion broken away at one end to show details of bracket fastening means;

Figure 7, a transverse section on the line 7—7 of Figure 1 showing details of the bracket fastening means; and Figure 8, a detail perspective view illustrating a portion of the bracket fastening means shown in Figures 6 and 7.

Referring to the drawing wherein we have illustrated preferred forms of our improved assist grips, Figure 1 shows a stem 1, preferably of some suitable compressible material, as cord, fabric, and/or rubber or the like, having a pompon 2 at one end and a bracket 3 at the other. A mold 4 conceals the means by which the pompon is fastened to the stem, while the bracket fastening is concealed by a crocheted or knitted covering 5, Figures 1 and 6. The pompon fastening device shown in the figures, comprises a single blank of sheet metal or the like, Figure 5, having a strap portion 6 and clamping or stem engaging end portions 7 which are substantially wider than the strap 6 and carry laterally extending tongues 8. The clamping portions 7 are provided with recesses or perforations 9, prongs 10 displaced or upset outwardly from the normal surface of the blank, and inwardly directed projections 19 for purposes hereinafter to be more fully explained.

When in operative position on the stem 1, strap 6 encircles a portion of the pompon 2 while the end or clamping portions 7 of the blank engage the stem 1 near its lower end, the terminal edges 11 and/or the projections 19 of the blank being pressed inwardly into or against the stem to compress and securely engage the same. When the lateral edges of the respective clamping ends 7 are brought adjacent to each other by suitable assembling implements, a tongue 8 of one clamp overlies a portion of the other clamp in position to be deflected to engage the recess or perforation 9 thereof. In making the form of device shown, the free end of the tongue 8 is pressed inwardly through or into said recess or opening 9 in the other clamp, thus interlocking the clamping ends, and where the tongue is long enough, presenting an inwardly directed projection as 12, Figure 3 extending into and further compressing the stem.

The prongs 10 projecting outwardly from the clamping members are arranged to permit the mold 4 to be moved longitudinally in one direction into clamp covering or concealing position, but to oppose the removal or displacement of the mold in the opposite direction. As shown, the points of prongs 10 extend downwardly and project sufficiently beyond the outer surfaces of the clamping members to engage portions of the interior surface of the mold. When the latter is moved into operative position, the ends of the prongs 10 may yield sufficiently for the purpose; but, where the mold core is made of wood, or is of other suitable construction, the sharpened points will extend into or otherwise engage it, to oppose the withdrawal or removal of the mold.

The illustrated bracket fastening means, usually concealed by a suitable covering 5, comprises a single metallic member bent to form a bracket holding loop 13 between stem gripping or clamping portions 14 provided with inwardly projecting prongs 15. In assembling the bracket fastening device with the stem, as 1 of the toggle grip shown in Figure 1, or 16 of the robe rail shown in Figure 6, the clamps 14 are brought into stem compressing position and, while in said position, a band or ferrule 17 is slid into clamp embracing position and is there crimped at 18, or otherwise treated or manipulated to secure the clamps 14 in operative stem engaging and compressing position and with the prongs 15 extending inwardly and into the stem 1.

From the foregoing description and statement of method of making our improved grip or hand hold, it will be apparent that we have provided a pompon fastening construction employing opposed stem clamping elements which are held in positive and practically unyielding engagement with the stem, as distinguished from other forms in which the security of the fastening is in great measure dependent on the stiffness of the wire or other material used in the clamp. Our fastening device is of simple construction and easily and effectively affixed to the end of a stem. Furthermore, when equipped with projections such as the prongs 10, the described clamping device also serves to retain the mold in operative clamp concealing position without the use of glue or other separate instrumentality for the purpose. The described bracket fastening means also utilizes opposed clamping elements which are held in operative position by any suitable device such as the band 17 or other equivalent thereof, thus maintaining the prongs 15 in effective engagement with the stem 1 to prevent endwise displacement of the clamps 14 when the stem is subjected to strain or tension.

We claim—

1. An assist grip comprising a stem, a pompon and a pompon fastening member co-operating with the stem and having interlocking clamp portions at its ends compressibly engaging the stem and a strap portion integral with and connecting said clamps and embracing a portion of the pompon.

2. An assist grip comprising a stem, an end device, and a fastener to anchor said end device to said stem including opposed clamp portions compressibly engaging a portion of the stem between them, a loop connecting said clamp portions, and a separate annular metal collar embracing portions of said clamps and having a deformation extending inwardly between the edges of the clamps.

3. The combination of a stem, opposed clamp portions compressibly engaging a portion of the stem between them, and a separate annular metal collar embracing portions of said clamps and having a deformation extending inwardly between the edges of the clamps.

4. The combination of a stem of compressible material, a clamping device having portions engaging opposite sides of an end portion of said stem between them, and a separate metal collar embracing portions of said clamping device and being deformed to hold the said portions in effective compressing engagement with the stem to prevent endwise displacement of the clamping device when the stem is subjected to strain or tension.

5. The combination of a stem, opposed clamp portions compressibly engaging a portion of the stem between them, and a separate annular metal collar embracing portions of said clamps and having an inwardly extending deformation co-operating therewith to prevent endwise displacement of the clamp portion when the stem is subjected to strain or tension.

HERMAN H. RUBIN.
MAURICE M. BALSAM.